(12) United States Patent
Oldani et al.

(10) Patent No.: US 8,439,438 B2
(45) Date of Patent: May 14, 2013

(54) PUSH-PUSH CUP HOLDER (75) Inventors: Raymond A. Oldani, Canton, MI (US); Scott Simon, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 13/206,619

(22) Filed: Aug. 10, 2011

(65) Prior Publication Data

US 2013/0038097 A1 Feb. 14, 2013

(51) Int. Cl.
*A47C 7/62* (2006.01)

(52) U.S. Cl.
USPC ............... 297/188.14; 297/188.15; 248/311.2

(58) Field of Classification Search .................. 297/188.14–188.17; 248/311.2
See application file for complete search history.

(56) References Cited

U.S. PATENT DOCUMENTS

| 4,256,281 | A | | 3/1981 | Harris et al. |
| 5,285,953 | A | * | 2/1994 | Smith ........................... 220/737 |
| 5,997,082 | A | | 12/1999 | Vincent et al. |
| 6,520,575 | B1 | | 2/2003 | Yuzawa |
| 6,834,838 | B2 | * | 12/2004 | Dennis et al. ............... 248/311.2 |
| 7,089,749 | B1 | * | 8/2006 | Schafer ............................ 62/3.2 |
| 7,350,757 | B2 | | 4/2008 | Baek |
| 7,455,341 | B2 | * | 11/2008 | Miyashita .................. 296/37.12 |
| 7,757,888 | B2 | * | 7/2010 | Ogura ........................... 220/737 |
| 7,874,535 | B2 | | 1/2011 | Ogura |
| 2006/0278790 | A1 | * | 12/2006 | Park ........................... 248/311.2 |

* cited by examiner

*Primary Examiner* — Sarah B McPartlin
(74) *Attorney, Agent, or Firm* — Vichig Chea; MacMillan, Sobanski & Todd, LLC (57) ABSTRACT

A cupholder has a substantially tubular shell configured to be mounted with a longitudinal axis oriented substantially vertically. A floor received in the shell is vertically movable along the longitudinal axis for defining a variable depth cup well. A ring coaxially atop the shell has a plurality of vertical guide extensions disposed around a periphery of the shell. The ring is vertically movable. A linkage is provided between the floor and the guide extensions providing reciprocal motion of the floor and the ring wherein pushing down the floor raises the ring and wherein pushing down the ring raises the floor.

14 Claims, 7 Drawing Sheets

PUSH-PUSH CUP HOLDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive cup holders, and, more specifically, to a mechanism for a cup holder that extends when needed and retracts to a substantially flush condition with a console when not in use.

Cup holders are a common convenience found in most automobiles and also in seating for theaters and the like. They may be provided in a variety of places within a vehicle including consoles between passenger seats and door-mounted arm rests, for example. For fixed seating such as theater seats, the cup holder may be formed in an armrest or within a beverage/food tray. Especially in luxury cars, it may be desirable to provide cup holders that are hidden or stowed when not being used to retain a beverage container in order to provide a cleaner, more elegant appearance.

In addition to styling considerations, other important factors such as ease of use, overall performance, and cost are important when designing a cup holder. Packaging space that is available for cup holders may be limited in some vehicles or other applications. Thus, it would desirable to provide a cup holder having a small profile while accommodating a variety of cup sizes in a manner that uses reduced packaging space and provides flexibility in locating the cup holder within a vehicle.

SUMMARY OF THE INVENTION

In one aspect of the invention, a cupholder is comprised of a substantially tubular shell configured to be mounted with a longitudinal axis oriented substantially vertically. A floor received in the shell is vertically movable along the longitudinal axis for defining a variable depth cup well. A ring coaxially atop the shell has a plurality of vertical guide extensions disposed around a periphery of the shell. The ring is vertically movable. A linkage is provided between the floor and the guide extensions providing reciprocal motion of the floor and the ring wherein pushing down the floor raises the ring and wherein pushing down the ring raises the floor.

DETAILED DESCRIPTION OF PREFERRED EMBODIMENTS

Figure 1:
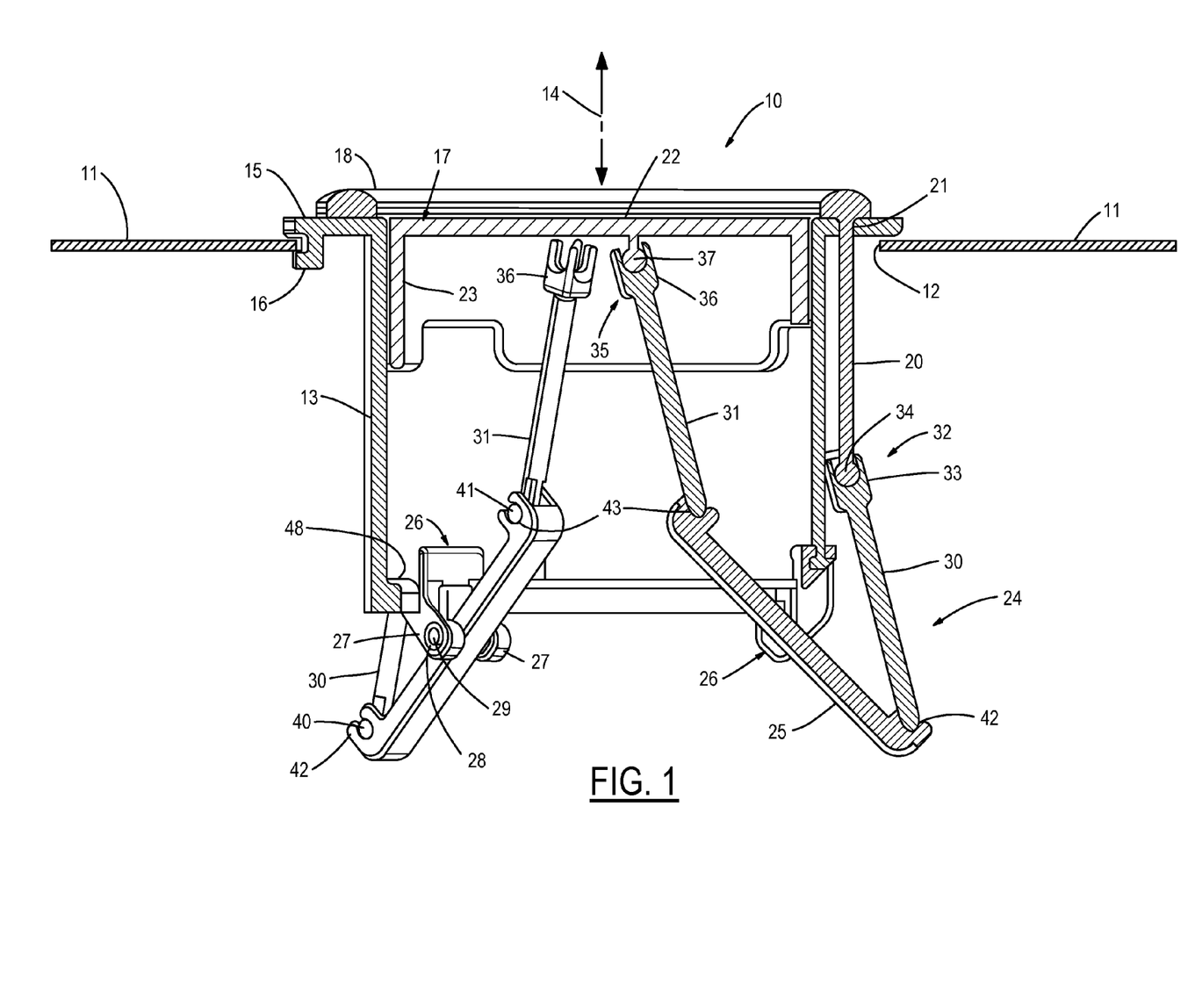
FIG. 1 is a cross-sectional view of a cup holder of the present invention in a neutral, retracted position.

Referring to FIG. 1, a cup holder 10 is shown mounted to a substantially horizontal panel 11 having an aperture 12 receiving cup holder 10. Panel 11 may be a horizontal top wall of a vehicle console, an armrest, or a beverage tray, for example, adjacent a seat of a vehicle or a theater seat. A substantially tubular shell 13 has fixed tubular sides and a top flange 15 that rests atop panel 11. A plurality of retaining tabs 16 project from the bottom surface of flange 15 in order to grasp panel 11 at various points around tubular shell 13. Thus, tubular shell 13 is fixed in place and functions as a foundation for the reciprocating movement of a floor 17 and a ring 18. Instead of tabs 16, cup holder 10 could be retained on panel 11 by other means such as screws, clips, or adhesives.

Shell 13 is preferably cylindrical and has a central vertical axis 14. Floor element 17 is received within tubular shell 13 and is vertically movable along axis 14 in order to define a variable depth cup well. Ring 18 sits atop flange 15 and has a plurality of vertical guide extensions 20 passing through respective slots 21 in flange 15. Ring 18 is concentric around floor element 17 and is preferably circular.

Floor 17 includes a cup-receiving surface 22 and a cylindrical collar 23 to ensure that surface 22 remains transverse to axis 14. Surface 22 is preferably circular to match typical beverage containers, but surface 22, ring 18, and the cross section of shell 13 could have other shapes such as oval.

A linkage 24 is provided between floor 17 and ring 18 to provide reciprocal motion of the two, wherein pushing down on floor 17 (e.g., pressing a beverage container into the cup holder) simultaneously raises ring 18 and lowers floor 17, and wherein subsequently pushing down on ring 18 lowers it while raising the floor back to the neutral, retracted position that is shown in FIG. 1.

There are a like plurality of linkages 24 and vertical guide extensions 20, each linkage 24 having a respective pivot arm 25 mounted to a respective clip 26 at the bottom of tubular shell 13. Each clip 26 has a pair of spaced arms 27 for pivotally receiving the respective pivot arm 25. Apertures 28 in arms 27 receive pivot pins 29 that extend from the sides of pivot arm 25 at or near its center. A first push rod 30 is coupled between a first (outer) end of pivot arm 25 and the lower end of a respective vertical guide extension 20. A second push rod 31 is connected between a second end of pivot arm 25 and a bottom surface of floor 17. A claw-style joint 32 connects push rod 30 and guide extension 20 wherein a claw 33 at one end of push rod 30 receives a ball 34 formed at the lower end of guide extension 20. Similarly, a claw-style joint 35 couples a second end of push rod 31 having a claw 36 for grasping a ball 37 mounted to floor 17. Preferably, all the components shown are made of molded thermoplastics such as ABS, and ball 37 is integrally molded ball 37 with floor 17. The thermoplastic is sufficiently flexible to allow the balls to snap into the flexible fingers that form the respective claws. Some components could also be formed of metals if desired.

The other end of push rod 30 includes a pivot pin 40 that is rotatably grasped within a receiving slot 42 on one end of pivot arm 25. Push rod 31 likewise includes a pivot pin 41 that is received in a receiving slot 43 at the other end of pivot arm 25.

Figure 2:
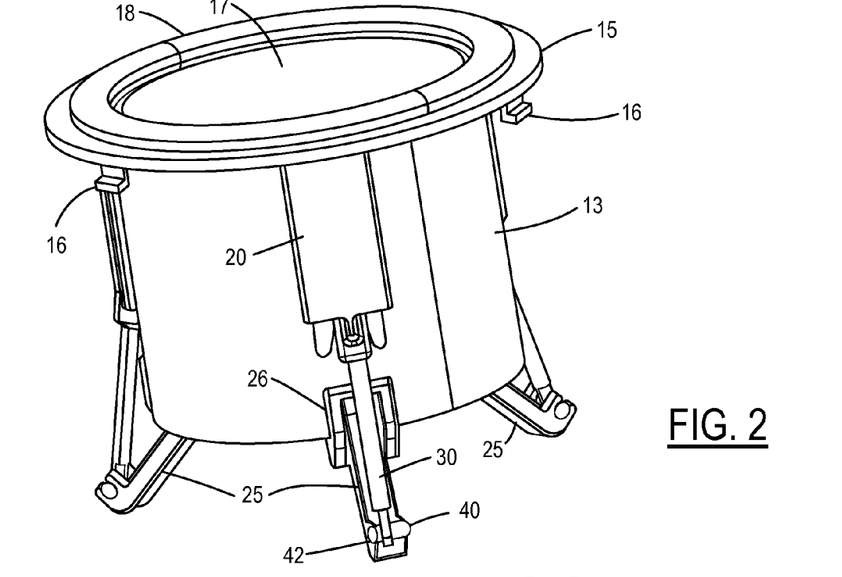
FIGS. 2 and 3 are side perspective views of the cup holder of FIG. 1 in a retracted position and in a raised, deployed position, respectively.

Pivot arm 25 moves in the fashion of a teeter totter so that one push rod is raised while the other is lowered. A neutral, retracted position is shown in FIG. 2 in which guide extensions 20 are at their lowest position, i.e., pivot arms 25 are rocked to one farthest extreme of their rotation wherein floor 17 is pushed up to its flush condition with flange 15.

Figure 3:
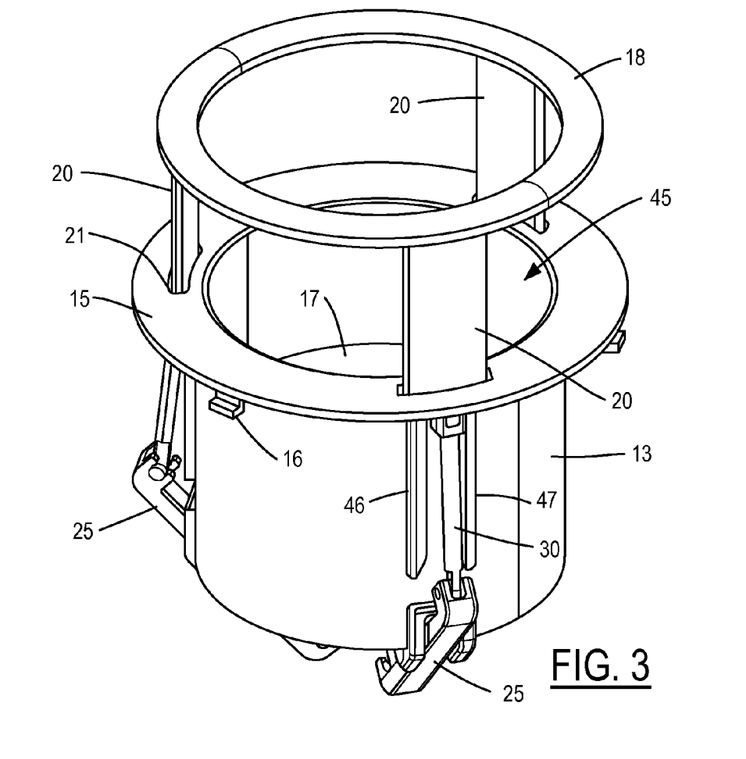

FIG. 3 shows the cup holder in the raised, deployed position with floor 17 pressed downward into tubular shell 13 to form a well 45 for receiving a lower portion of a beverage container (not shown) and with ring 18 forming an upper rail for retaining an upper end of the beverage container. As shown in FIG. 3, a pair of retaining walls 46 and 47 may be integrally formed in an outer surface of tubular shell 13 in order to constrain the vertical guide extensions 20 as they slide up and down. When floor 17 is at its lowest, fully-deployed position (and cup well 45 has its maximum depth), a lower end of floor collar 23 rests on a ledge 48 (FIG. 1).

Figures 4, 5:
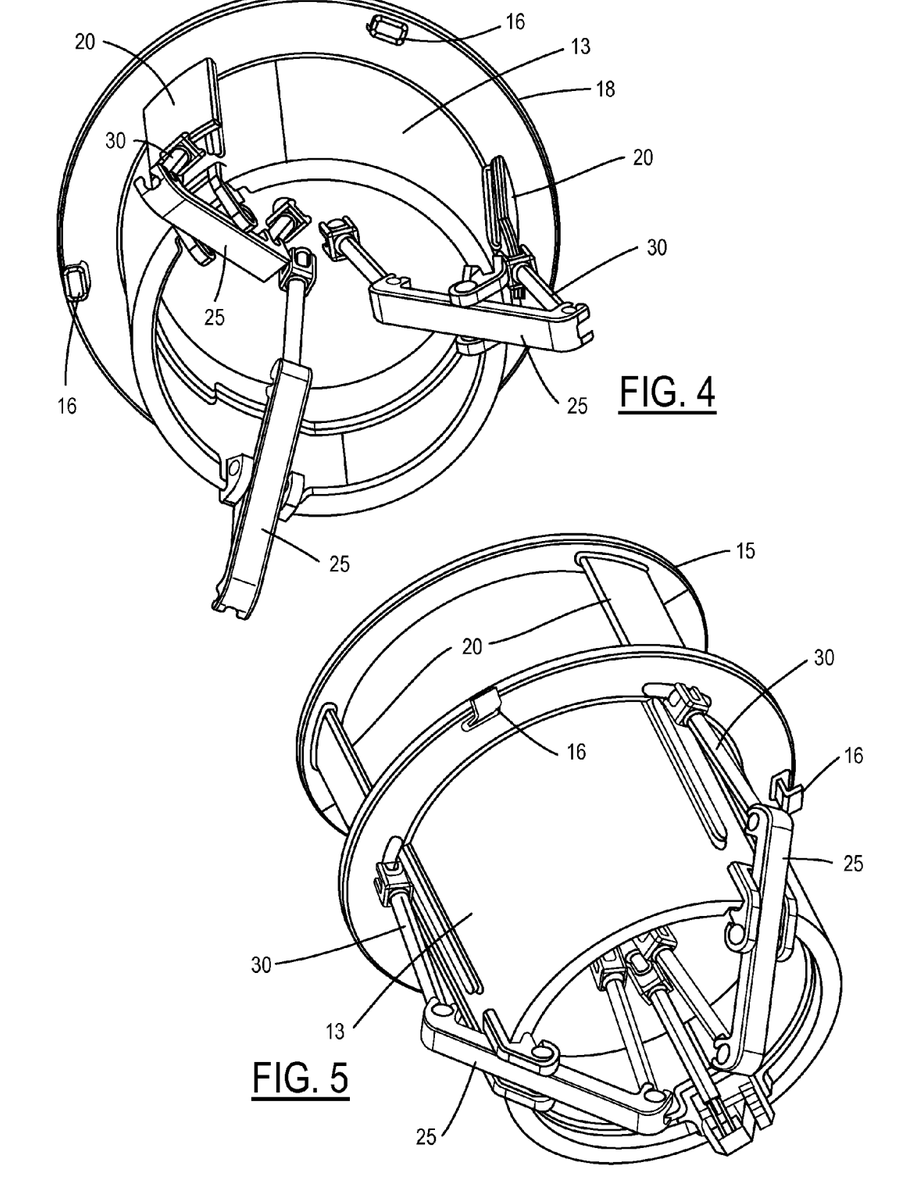
FIGS. 4 and 5 are bottom perspective views of the cup holder of FIG. 1 in a retracted position and in a raised, deployed position, respectively.

FIGS. 4 and 5 shows the difference in position of the pivot arms and the push rods between the raised floor position of FIG. 4 and the lowered floor position in FIG. 5. Preferably, the cup holder incorporates features for providing positive retention forces at some or all deployment positions so that the position does not change too easily. Detents or ratchets can be used (not shown) for retention at predetermined positions such as the neutral position or a fully deployed position. In one preferred embodiment, frictional retention is incorporated into the linkage so that a desired amount of resistance to movement is obtained throughout the full range of motion and/or increased resistance at predetermined positions.

Figure 6:
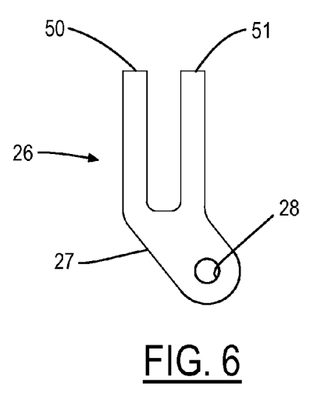
FIG. 6 is a side view of a clip used in the embodiment of FIG. 1.
Figure 7:
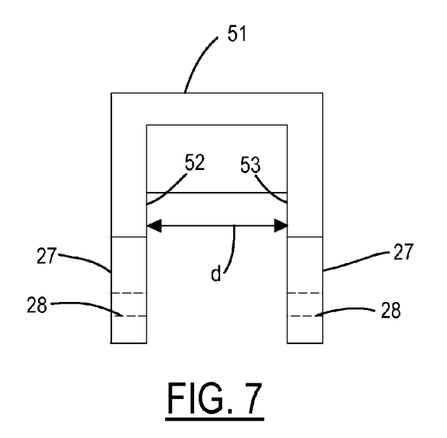
FIG. 7 is a top view of the clip of FIG. 6.
Figure 8:
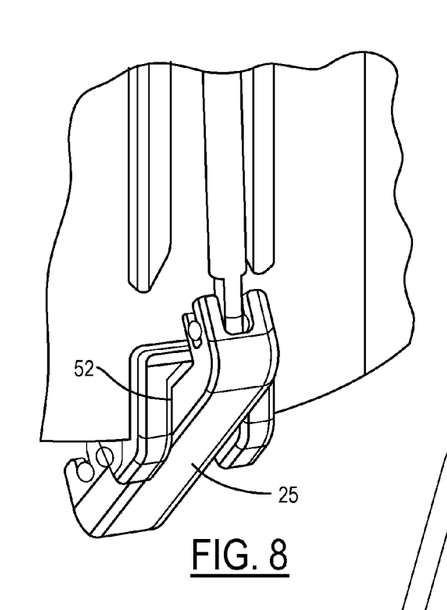
FIG. 8 is a close-up view showing interaction of a push rod, pivot arm, and clip when the cup holder is in the raised position.
Figure 9:
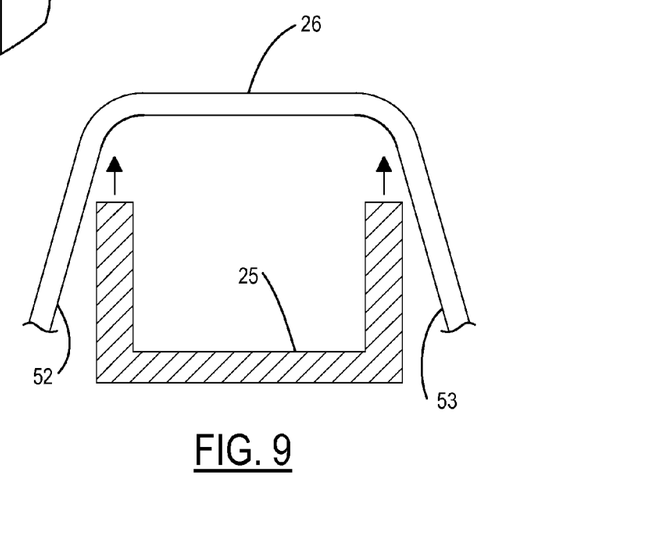
FIG. 9 illustrates a squeezing relationship between the pivot arm and clip.
Figure 10:
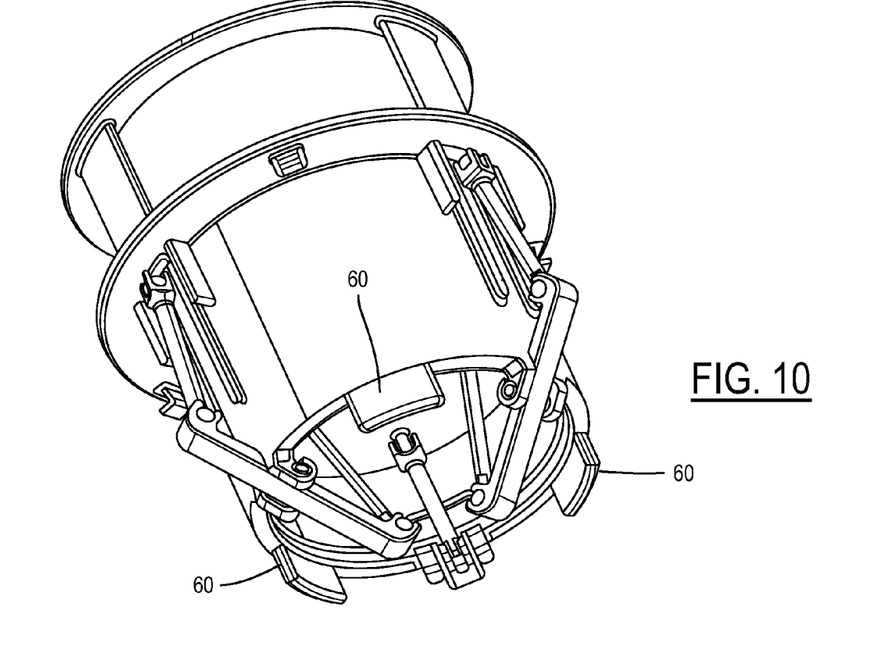
FIG. 10 is a perspective view of an alternative embodiment of the cup holder in a deployed position.
Figure 11:
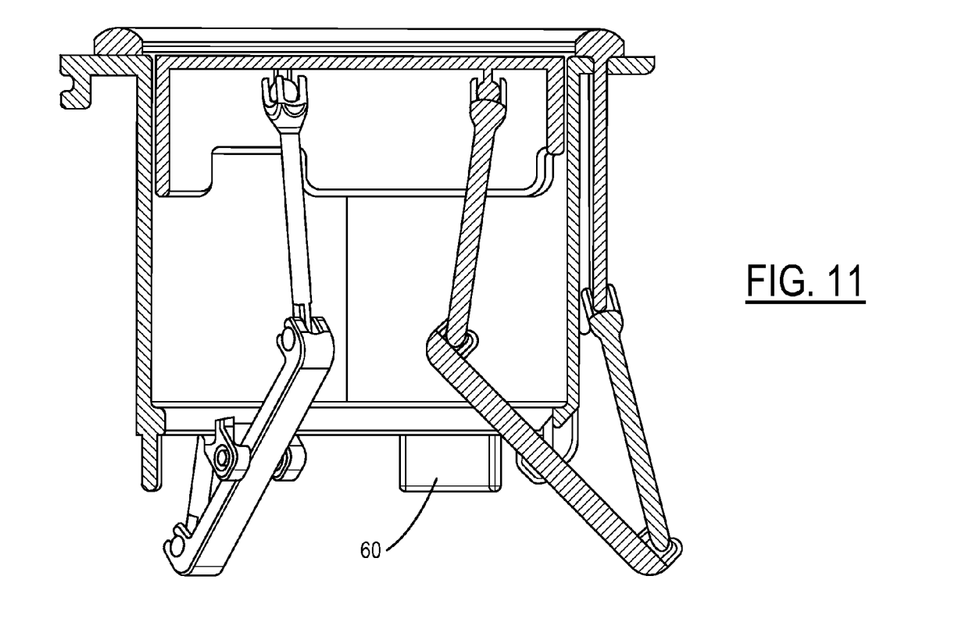
FIG. 11 is a cross section showing the cup holder of FIG. 10 in a retracted position.
Figure 12:
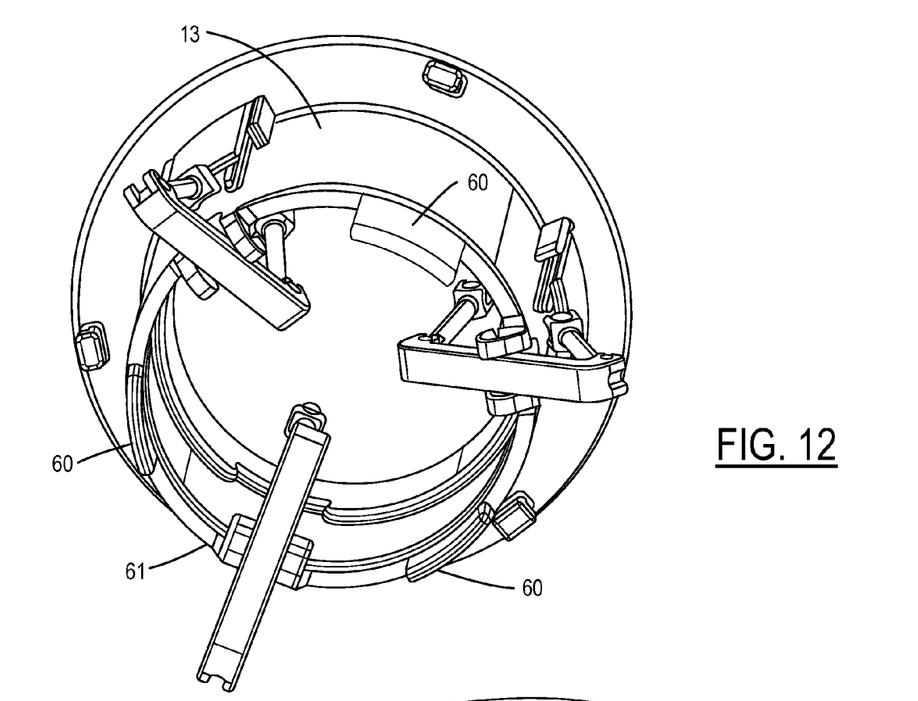
FIG. 12 is a bottom perspective view of the cup holder of FIG. 10 in a retracted position.
Figure 13:
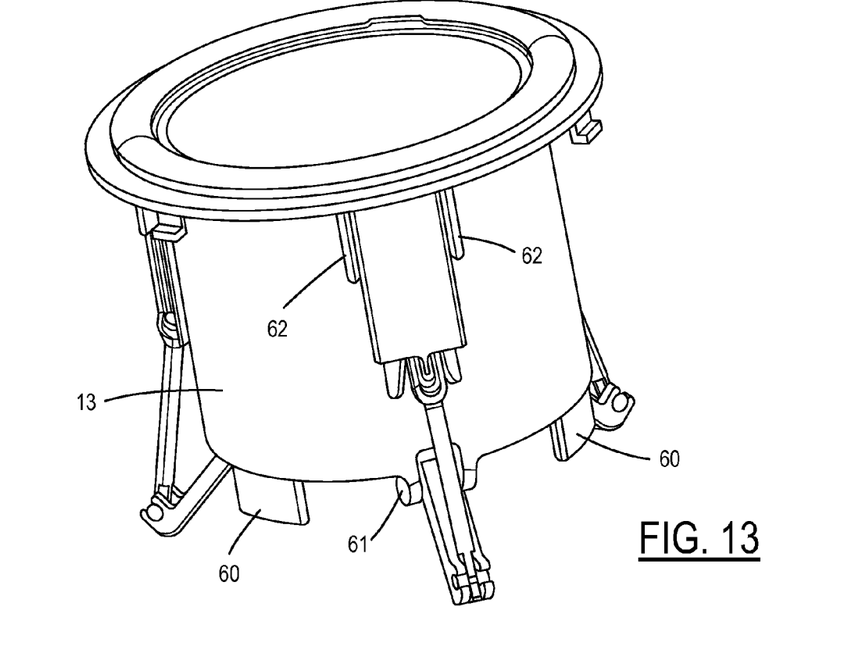
FIG. 13 is a side perspective view of the cup holder of FIG. 10 in a retracted position.
Figure 14:
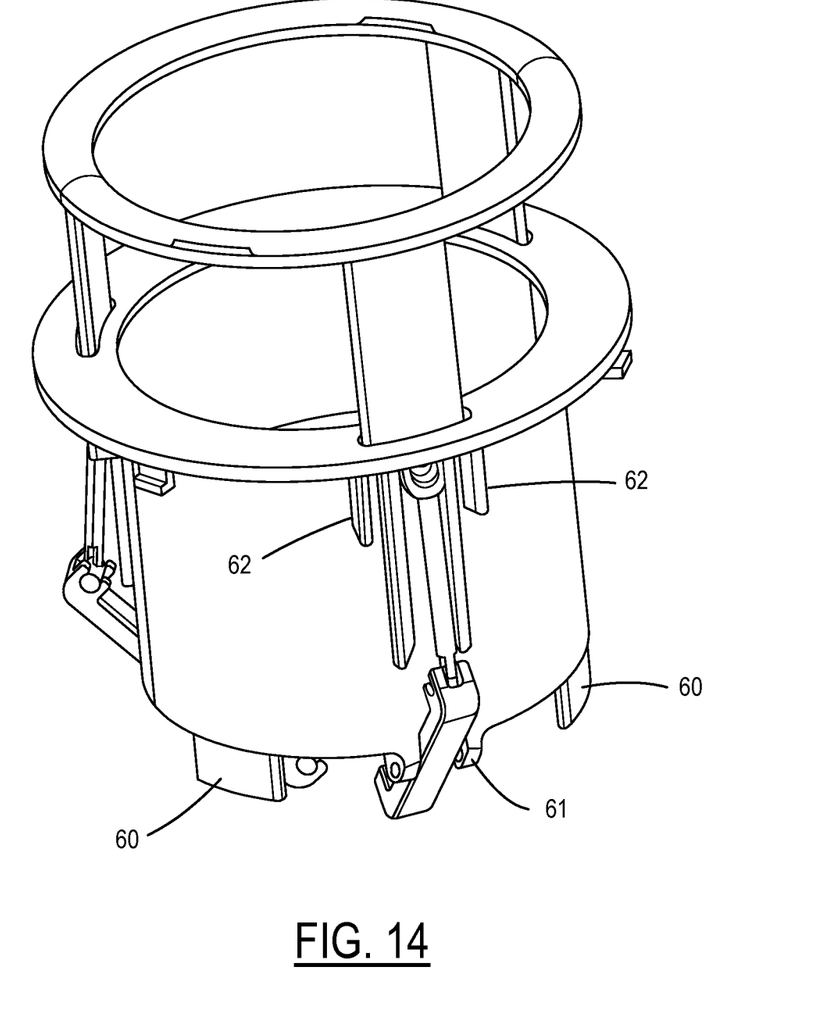
FIG. 14 is a side perspective view of the cup holder of FIG. 10 in a raised position.

In particular, a variable resistance may be built into the interface between clip 26 and pivot arm 25. Clip 26 is shown in greater detail in FIGS. 6 and 7. Side arms 27 include apertures 28 for receiving pivot pins on the pivot arm. A pair of fingers 50 and 51 attach clip 26 to the bottom of tubular shell. Arms 27 have interior surfaces 52 and 53 spaced apart by a distance d to create a channel or slot area for receiving the pivot arm. FIG. 8 shows pivot arm 25 fully inserted into a slot area between surfaces 52 and 53. FIG. 9 is greatly exaggerated to show side surfaces 52 and 53 having a sloping arrangement such that pivot arm 25 is increasingly squeezed by surfaces 52 and 53 as it penetrates further into the slot area. As a result, friction between pivot arm 25 and clip 26 increases as the cup holder nears the raised, deployed position, thereby providing a positive retention force when the cup holder is deployed (i.e., opened). Any desired progressive squeezing force can be obtained by alterations in the distance d in order to created desired retention forces for the floor and ring in any particular positions. Alternatively, control of friction could be provided between other sliding surfaces such as between the vertical guide extensions and the receiving-slots in the tubular shell, for example.

FIGS. 10-14 show an alternative embodiment wherein the claw-style joints between the push rods and floor are located at the outer periphery of the floor instead of at near the center of the floor as shown in the previous embodiment. In addition, a plurality of extension tabs 60 has been added in order to facilitate integration of the clip 61 into cylindrical shell 13. Frame walls 62 provide additional support for the guide extensions and could mate with matching features in the supporting panel to increase the robustness of the mounting of the cup holder.

Many other variations and embodiments will be readily apparent to those skilled in the art. For example, movable fingers mounted on the tubular shell could spring radially outward between the vertical guide extensions as the cup well is opened by lowering the floor to grip different sized containers. The fingers would move out of the way when the floor and the floor collar return to a raised position. In another variation, the floor could be formed by two-shot molding in order to incorporate a TPO mat on the upper, cup-receiving surface. Either the ring or the shell could be formed of a clear or translucent ABS plastic in order to incorporate ambient lighting into these components (e.g., by arranging an LED to direct light into the ring or shell).

What is claimed is:

1. A cupholder comprising:
a substantially tubular shell configured to be mounted with a longitudinal axis oriented substantially vertically;
a floor received in the shell and vertically movable along the longitudinal axis for defining a variable depth cup well;
a ring coaxially atop the shell having a plurality of vertical guide extensions disposed around a periphery of the shell, wherein the ring is vertically movable; and
a linkage between the floor and the guide extensions providing reciprocal motion of the floor and the ring wherein pushing down the floor raises the ring and wherein pushing down the ring raises the floor, wherein the linkage is comprised of a plurality of rockers, wherein each rocker is coupled to the floor and to a respective guide extension and wherein each rocker comprises:
a pivot arm;
a first push rod coupled between a first end of the pivot arm and a respective guide extension; and
a second push rod coupled between a second end of the pivot arm and the floor, wherein the pivot arm is pivotably attached to the shell at a pivot point between the first and second ends.

2. The cupholder of claim 1 wherein the shell comprises a plurality of yokes, each yoke attached to a respective pivot arm at the pivot point.

3. The cupholder of claim 2 wherein each yoke is comprised of a clip having a channel for applying a progressive squeezing force on the pivot arm to provide a frictional force for holding the floor and ring in at least one predetermined position.

4. The cupholder of claim 1 wherein the first push rod is joined to the respective guide extension by a first claw-style joint, and wherein the second push rod is joined to the floor by a second claw-style joint.

5. The cupholder of claim 1 wherein the shell has an outer tubular surface having a plurality of guide rails receiving the guide extensions.

6. The cupholder of claim 1 wherein the shell includes an upper flange with a plurality of slots each slidably receiving a respective guide extension.

7. The cupholder of claim 6 wherein the floor and the ring have a neutral position in which the ring is disposed against the flange and the floor is substantially coplanar with the flange.

8. The cupholder of claim 7 wherein the floor and the ring have a deployed position in which the cup well is at a maximum depth and the ring is at a maximum height above the upper flange.

9. The cupholder of claim 1 wherein the shell is substantially cylindrical, wherein the floor is comprised of a circular plate, and wherein the ring is substantially circular.

10. A cupholder system comprising:
a substantially horizontal surface adjacent a seat, wherein the horizontal surface includes an aperture;
a substantially tubular shell mounted within the aperture with a longitudinal axis oriented substantially vertically;
a floor received in the shell and vertically movable along the longitudinal axis for defining a variable depth cup well;
a ring coaxially atop the shell having a plurality of vertical guide extensions disposed around a periphery of the shell, wherein the ring is vertically movable; and
a linkage between the floor and the guide extensions providing reciprocal motion of the floor and the ring wherein pushing down the floor raises the ring and wherein pushing down the ring raises the floor
wherein the shell includes an upper flange with a plurality of slots each slidably receiving a respective guide extension, and wherein the upper flange overlies an edge of the aperture.

11. The cupholder system of claim 10 wherein the floor and the ring have a neutral position in which the ring is disposed against the flange and the floor is substantially coplanar with the horizontal surface, and wherein the floor and the ring have a deployed position in which the cup well is at a maximum depth and the ring is at a maximum height above the upper flange.

12. The cupholder system of claim 10 wherein the horizontal surface is comprised of an armrest associated with the seat.

13. The cupholder system of claim 10 wherein the horizontal surface is comprised of a beverage tray associated with the seat.

14. The cupholder system of claim 10 wherein the horizontal surface is comprised of a console of an automotive vehicle.

\* \* \* \* \*